United States Patent [19]

Jinzaki

[11] Patent Number: 4,975,833
[45] Date of Patent: Dec. 4, 1990

[54] MULTIPROCESSOR SYSTEM WHICH ONLY ALLOWS ALTERNATELY ACCESSING TO SHARED MEMORY UPON RECEIVING READ AND WRITE REQUEST SIGNALS

[75] Inventor: Akira Jinzaki, Yokohama, Japan

[73] Assignee: Fujitsu Limited, Kawasaki, Japan

[21] Appl. No.: 433,433

[22] Filed: Nov. 8, 1989

Related U.S. Application Data

[63] Continuation of Ser. No. 73,717, Jul. 15, 1987, abandoned.

[30] Foreign Application Priority Data

Jul. 15, 1986 [JP] Japan .................... 61-165731

[51] Int. Cl.$^5$ .................... G06F 13/18; G06F 15/16
[52] U.S. Cl. .................... 364/200; 364/228.1; 364/242.91; 364/228.3; 364/242.6; 364/134
[58] Field of Search ... 364/200 MS File, 900 MS File, 364/134; 340/825.50

[56] References Cited

U.S. PATENT DOCUMENTS

| | | | |
|---|---|---|---|
| 4,121,285 | 10/1978 | Chen | 364/200 |
| 4,453,214 | 6/1984 | Adcock | 364/200 |
| 4,470,109 | 9/1984 | McNally | 364/200 |
| 4,574,350 | 3/1986 | Starr | 364/200 |
| 4,620,278 | 10/1986 | Elsworth et al. | 364/200 |
| 4,621,318 | 11/1986 | Maeda | 364/200 |
| 4,764,865 | 8/1988 | Temple, III | 364/200 |

FOREIGN PATENT DOCUMENTS

| | | | |
|---|---|---|---|
| 58-129567 | 8/1983 | Japan | 364/134 |
| 59-91563 | 5/1984 | Japan | 364/134 |
| 59-229662 | 12/1984 | Japan | 364/134 |
| 60-245063 | 12/1985 | Japan | 364/134 |
| 60-246470 | 12/1985 | Japan | 364/134 |

Primary Examiner—Thomas C. Lee
Attorney, Agent, or Firm—Staas & Halsey

[57] ABSTRACT

In a multiprocessor system, wherein each local group a processor its local memory are included, and the local memory is accessed from a processor either in a same group or another group through a communication media. The system according to the present invention is provided with a LOCK flag, a SYNC flag and a control circuit for controlling accesse to the local memory by a processor of the same group and a processor of the other group depending on the status of the flags. The LOCK flag inhibits reading from the memory by the other processor while the same group processor is writing therein. The SYNC flag permits reading of the memory by the other processor and inhibits the same group processor from writing therein. A read request as well as a write request to the memory from both processors are input to the control circuit which controls conveyance of the requests to the memory. Thus, the flag setting/resetting is carried out within a group, therefore, synchronization software which requires much overhead, or control lines which interconnect the processors are not necessary, resulting in accomplishment of a reduced network traffic, that is, a high-speed multiprocessor operation.

7 Claims, 5 Drawing Sheets

| STATUS | | OPERATION | |
|---|---|---|---|
| SYNC FLAG BIT | LOCK FLAG BIT | READ REQ FROM PROCESSOR PB | WRITE REQ FROM PROCESSOR PA |
| SET | SET | N | Y |
| RESET | RESET | Y | N |
| RESET | SET | Y | N |
| SET | RESET | Y | N |

| STEP | STATUS | | OPERATION | |
|---|---|---|---|---|
| | SYNC FLAG BIT | LOCK FLAG BIT | WRITING IN BY PROCESSOR PA | READING OUT BY PROCESSOR PB |
| (1) | SET | SET | Y | N |
| (2),(3) | SET | SET | Y | N |
| (4) | RESET | RESET | N | Y |
| (5) | SET | RESET | N | Y |
| (6) | SET | SET | Y | N |
| (7) | RESET | RESET | N | Y |

MULTIPROCESSOR SYSTEM WHICH ONLY ALLOWS ALTERNATELY ACCESSING TO SHARED MEMORY UPON RECEIVING READ AND WRITE REQUEST SIGNALS

This is a continuation of copending application(s) serial number 07/073,717 filed on July 15, 1987 now abandoned.

This invention relates to a communication scheme between processors in a multiprocessor computer architecture. More particularly, this invention relates to an improved accessing of shared memory which is located in each processor group and is used for inter-processor data transmission.

2. Description of the Related Art

In the past several years, multiprocessor systems have been intensively employed, where plurality of processors 100 are provided, with which a data processing is carried out concurrently in parallel so that a high-speed operation which a single processor can never achieve can be realized. Among several types of the multiprocessor systems, the present invention relates to the one having a shared memory located in each processor group exclusively for transferring a data as shown in FIG. 1. In order to achieve the high-speed operation, it is required that a data transfer between the processors must be synchronized with a data processing therein. The above-referred term "synchronize" or "synchronization" is hereinafter used to mean an adjustment of timing in order to start and stop the tasks which compete with each other. Therefore, in the multiprocessor system, an easy means for fast operation of this synchronization has been necessarily requested.

A method of processor synchronization that has been employed in a system by software control is shown in FIG. 2. A processor PA (114) having its local memory LMA, i.e. a memory 116 which is directly accessed from its processor, and another processor PB (118) having its local memory LMB (120) are interconnected with each other by a communication network 3, thus composing a multiprocessor system. The communication network 3 may be a bus or another network, such as a local-area network or a telephone line. For the second processor PB to read or write to the memory LMA of the first processor PA, the second processor PB must check the status of the local memory LMA using flags by way of the communication network 3 and of a predetermined protocol. In other words, some particular bits, the so-called semaphore flags, are provided within the memory, and synchronization is carried out by the so-called "Test and Set" command using the semaphore flags. Problems of this method are: (1) the software for synchronization is very complex and requires an overhead operation, i.e. an operation required for indirect jobs, though the hardware is simpler than the below-described second method, and; (2) the communication for the synchronization control via the network causes an increase of network traffic. Accordingly, efficiency of the network throughput is deteriorated, or the network is required to be of a higher performance capability.

A second method of processor synchronization that has been employed in a system by hardware control is shown in FIG. 3. Similarly to the configuration of FIG. 2, processors PA (122) and PB (124) each have a local memory (126) and (128) and a control line 4 between the two processors, and have communication means 5 and 5' directly connected from each processor to the other processor's local memory. Each of the communication means 5 and 5' includes a data bus 52 and a control line 51 for access control. The lines 4 are used exclusively for synchronization control. In this system, the load of the software as well as the overhead operation of the system is light. However, the line 4 for synchronization must be installed between all the processors to form a complete graph as shown in FIG. 4, where, as an example, five processors P1 (130) through P5 (138) are included. The required quantity of the control lines 4 for the system is $n(n-1)$, where n indicates number of the processors. Therefore, the problem is that the hardware structure of the system becomes too complicated to be applied to a large scale multiprocessor system.

A third method of processor synchronization is carried out by hardware or a combination of hardware and software, as reported in "Multiprocessor Cache Synchronization" by Philip Bitar et al in the IEEE International Symposium on Computer Architecture 1986. However, there are still the same problems as those of the software control.

The latest trends of the multiprocessor synchronization system are also reported in papers: "A Class of Compatible Cache Consistency Protocols and their Support by the IEEE Futurebus" by Paul Sweazey et al on the same issue, and "Cache Coherence Protocols: Evaluation Using Multiprocessor Simulation Model" by James Archibald et al on ACM (Association for Computing Machinery) Transaction on Computer Systems, vol. 4, No. 4, Nov. 1986.

SUMMARY OF THE INVENTION

It is a general object of the invention, therefore to provide a multiprocessor system having a simple hardware configuration as well as having no load of the software for the processor synchronization, and achieving a high speed processor operation and a high performance capability on network.

According to the multiprocessor system of the present invention, a set of flag bits, i.e. a LOCK bit and SYNC bit, and a control circuit for controlling accesses to a local memory are provided for each processor group. When the LOCK bit is in a SET state, a reading-out of the local memory in a the first processor group from a second processor is inhibitted while the first processor is writing into the local memory. The SYNC bit in a RESET state accepts a read request to the local memory from the second processor after the first processor finishes writing into the local memory, as well as inhibits writing into the local memory from the first processor. Accordingly, the setting of the LOCK bit as well as the resetting of the SYNC bit can be carried out within each group without using network communication. The setting of the SYNC bit is carried out implicitly by the memory access, in other words, it does not require a network communication.

Therefore, the software is free from the job for synchronization, and the network for synchronization control is replaced by the access control lines. Thus, a reduced network traffic or a less sophisticated network is accomplished owing to the deletion of synchronization control via the network, resulting in a high speed processor operation as well as a high performance capability of the network.

The above-mentioned features and advantages of the present invention, together with other objects and advantages, which will become apparent, will be more fully described hereinafter, reference being made to the accompanying drawings forming a part hereof, wherein like numerals refer to like parts throughout.

DESCRIPTION OF THE PREFERRED EMBODIMENT

Figure 1:
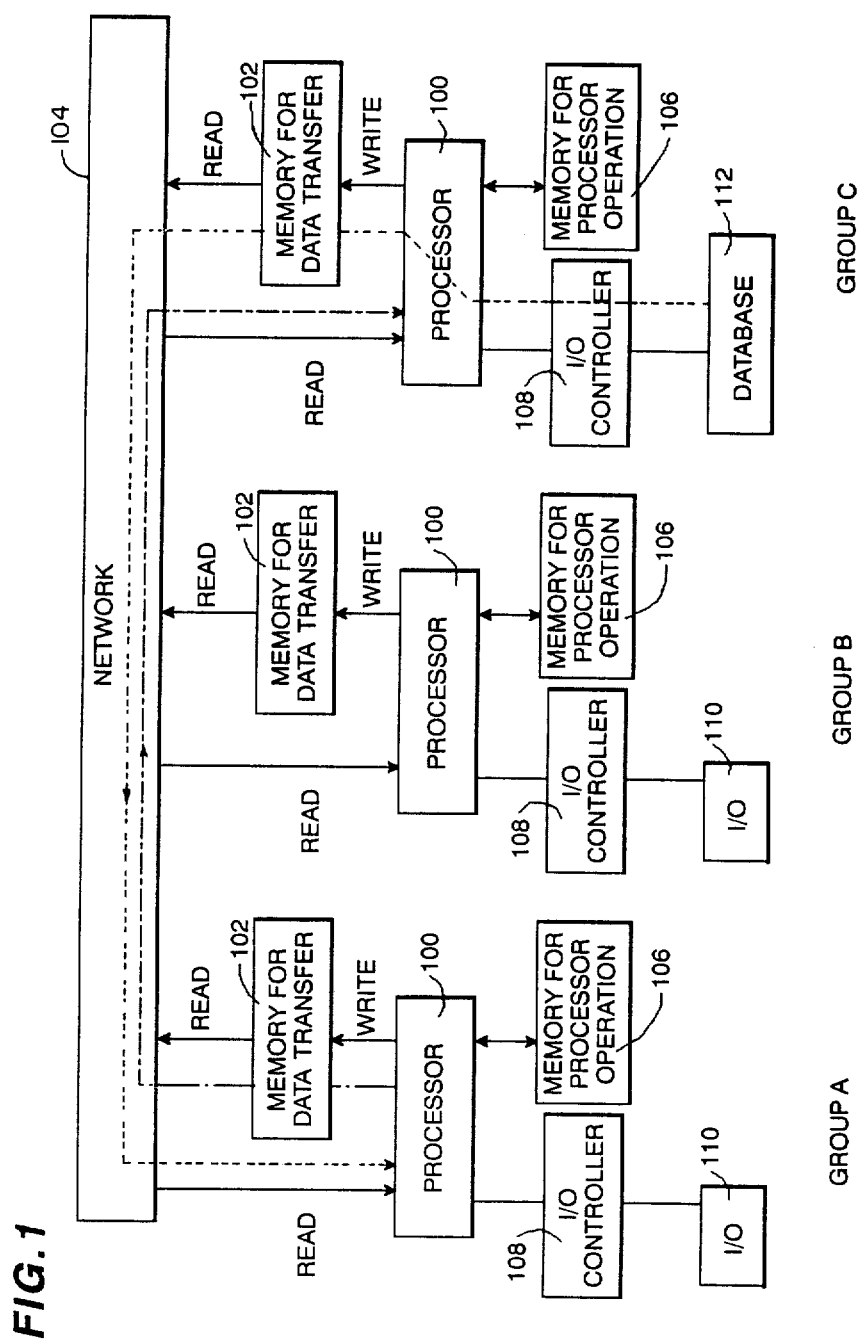
FIG. 1 shows a general concept of a multiprocessor system using a memory for data transfer.
Figure 2:
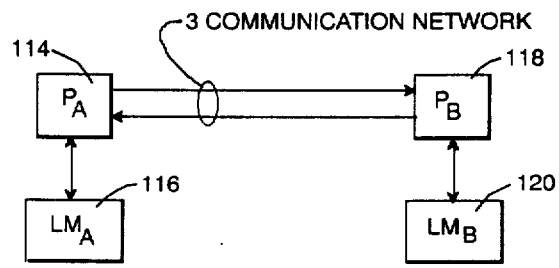
FIG. 2 shows schematic configuration of a prior art multiprocessor system where the synchronization is controlled by software

An embodiment of the present invention is hereinafter described referring to a principle block, diagram of FIG. 5, where the multiprocessor system comprises two processors 11 (PA) and 12 (PB) shown as representatives of a plurality of processors. Each processor PA and PB has it's own local memory LMA and LMB respectively The term "own" is used to mean "belonging to the same group', i.e. in other words "accessable without using a network" A term "other" is hereinafter used to mean the contrary meaning of "own'. The memory LMA of the group A is accessed from it's own processor PA and also from the processor PB of the other group B, thus the memory is shared by the two processors. A control circuit 31 (CTLA) having a set (41) of flag bits, one named a LOCK bit and another one named a SYNC bit, are provided in the group A, for controlling the transfer of an access request from the processor PA or PB to the memory LMA. Symmetrically similar to the control circuit CTLA, a second control circuit 32 (CTLB) having a set of flag bits (41) is provided in the group B, for controlling the transfer of an access request from the processor PA or PB to the memory LMB. Function of the control circuits and the flag bits shall be described in detail later on.

Communication means 6 (or 6') between the processors PA (or PB) and each own local memory LMA (or LMB) comprises: data buses 11-21D, 12-22D, for each processor PA, PB to write data into each own memory LMA, LMB; and access control lines 21-11C, 22-12C, each for delivering an acknowledge signal ACK to each request source PA, PB. Communication means 7 (or 7') between the processor PA (or PB) and the memories LMB (or LMA) of their respectively opposite groups are composed of: data buses 21-12D, 22-11D, for each processor PB, PA to read data out of their respectively opposite group's memory LMA, LMB; access control lines 21-12C, 22-11C, each for delivering an acknowledge signal ACK to each request source PB, PA; and access control lines 11-32C, 12-31C, each for delivering a read request signal "Read REQ" from each other processor PB, PA to each own control circuit CTLA, CTLB The functions of the flag bits 41 (or 42) of the processor PA (or PB) are as follows:

1. The LOCK bit 41-1 (or 42-1) and the SYNC bit 41-2 (or 42-2) of each group A, B are both set by initialization respectively by their own processor PA (or PB).

2. The LOCK bit 41-1 (or 42-1) is set before the own processor PA (or PB) writes data in the own memory LMA (or LMB), as well as is reset after the writing is finished, by the own processor PA (or PB).

3. The SYNC bit is reset as soon as the own processor PA (or PB) finishes writing data into the own memory LMA (or LMB).

4. When the LOCK bit and the SYNC bit are both in a SET state, a read request signal "Read REQ" from the other processor PB (or PA) to the own memory LMA (or LMB) is inhibitted; and a write request signal "Write REQ" from the own processor PA (or PB) to the own memory LMA (or LMB) is permitted.

5. When the LOCK bit is in a RESET state and the SYNC bit is in a SET state, the "Write REQ" from the own processor PA, (or PB) is inhibited and the "Read REQ" from the other processor PB (or PA) is permitted.

6. When the status of the flag bits are other than those of the above-described [4] and [5], a write request "Write REQ" from the own processor PA (or PB) to the own memory LMA (or LMB) is inhibitted and a read request signal "Read REQ" from the other processor PB (or PA) to the own memory LMA (or LMB) is permitted.

Figures 6, 7, 9:
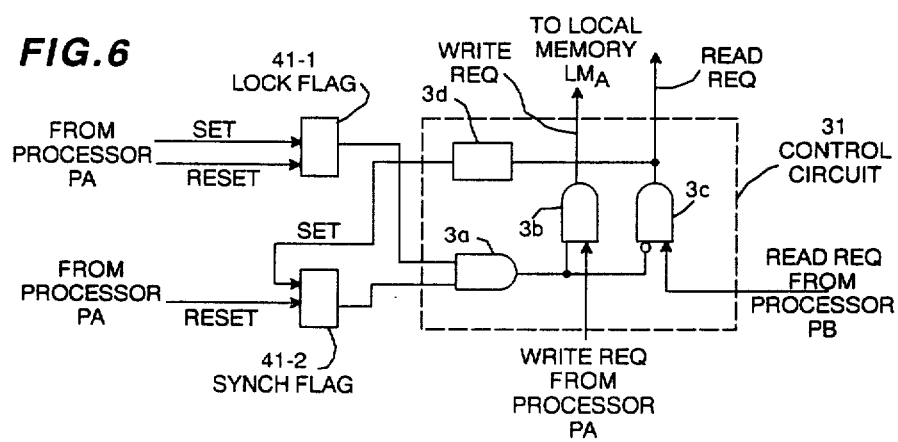
FIG. 6 shows in detail the control circuit for the present invention.
FIG. 7 shows a truth table of the flags for the present invention.
FIG. 9 shows a truth table corresponding to the flow chart shown in FIG. 8.

The operation of the processor synchronization according to the present invention is hereinafter described, referring to a sample case where the processor PA writes data into the own memory LMA and then the other processor PB reads the written data, and the same sequence is repeated. A typical structure of the control circuit 31 or 32 (CTLA or CTLB) and the flag bits 41 (or 42) is shown in FIG. 6, and its truth table is shown in FIG. 7, where positive logic is employed. As shown in FIG. 6, the control circuit CTLA 31 (or CTLB 32) is composed of AND gates 3a, 3b, 3c and a delay circuit 3d. The flag bit 41 comprises widely used memory devices, such as flip-flops, one, 41-1, for the LOCK bit and one, 41-2, for the SYNC bit. The AND gate 3a is gated by the LOCK bit as well as the SYNC bit. One of the input terminals of the AND gate 3c is gated by the read request signal "Read REQ" from the other processor 12 (PB), because the data transfer is from the own processor 11 (PA) to the other processor 12 (PB) One of the input terminals of the AND gate 3b is gated by the write request signal "Write REQ" from the own processor 11 (PA). The delay circuit 3d, formed of widely used delay device to produce a predetermined delay time, which is equivalent to the time required for finishing reading data to be transferred by a single operation. Accordingly, the SYNC bit 41-2 is automatically set as soon as the reading is finished. Thus the control circuit CTLA and the flag bits operate as shown in the truth table of FIG. 7, where "Y" indicates that the request is permitted and "N" indicates that the request is inhibitted.

Flows of the over all operations for synchronizing the independently operating processors of the two groups, where the A group includes the processors 11 (PA), the memory 21 (LMA), the control circuit 31

Figure 8:
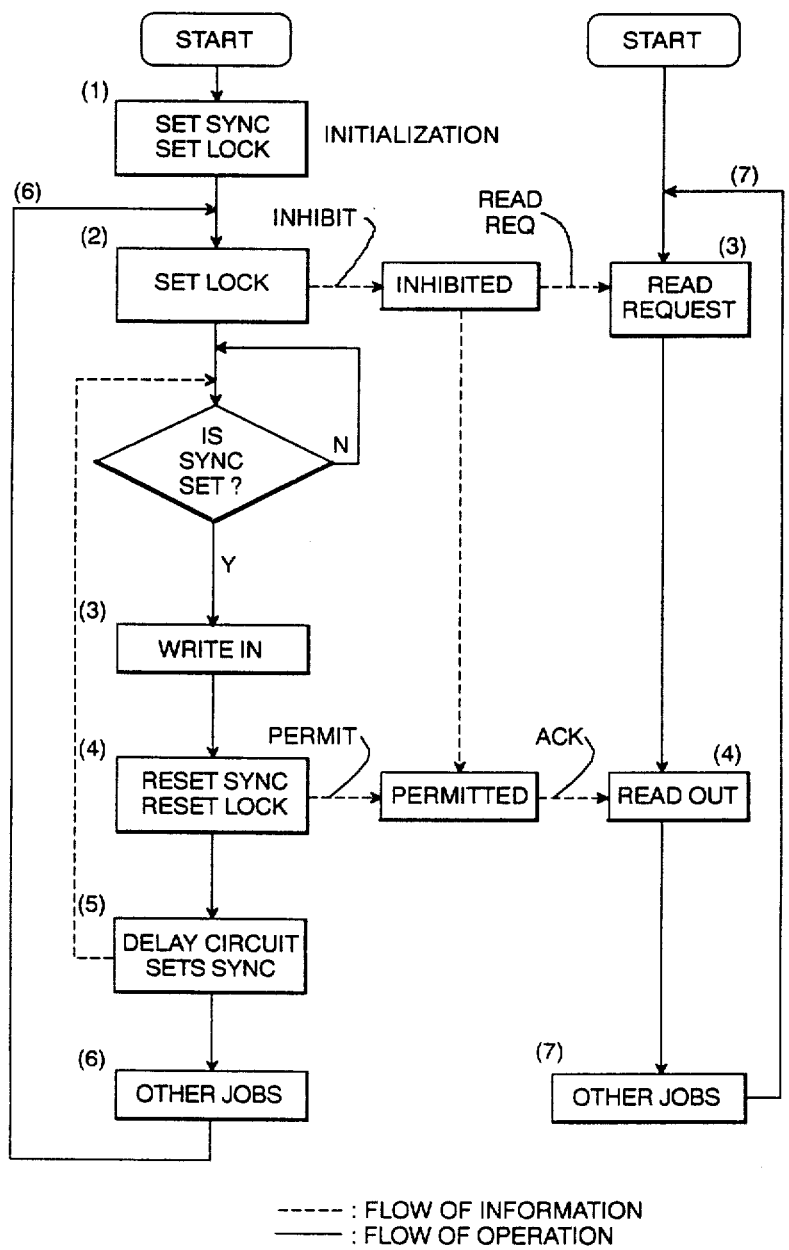
FIG. 8 shows flow charts for explaining the operation of the present invention.

(CTLA) and its flag bits 41, and the B group includes the processors 12 (PB), the memory 22 (LMB), the control circuit 32 (CTLB) and its flag bits 42, are as described below and shown in FIG. 8. The numerals for the procedure steps are also cited in the flow charts of FIG. 8. Dotted lines in FIG. 8 show "flows" of the flag information.

1. Each of the LOCK bits (41-1, 42-1) and SYNC bits (41-2, 42-2) of the processors 11 and 12 is set as an initialization before beginning the operation, and in this state of the flag bits: the own processor 11 (PA) is permitted to write into the own memory 21 (LMA); and the other processor 12 (PB) is inhibitted to read the same memory 21 (LMA).

2. The processor 11 (PA) must set the LOCK bit 41-1 before writing data into the own memory 21 (LMA). (However, the first setting after the initialization is not necessary because the setting is duplicate.)

3. The processor 11 (PA) writes data into the own memory 21 (LMA), and on the other hand, the other processor PB has transmitted a read request signal, Read REQ, to the control circuit 31 (CTLA) and has been waiting for the acknowledgement signal ACK.

4. As soon as the writing-in is finished, the LOCK bit 41-1 as well as the SYNC bit 41-2 is reset, and the acknowledge signal ACK is transmitted from the memory permitting the processor 12 (PB) to read from the memory 21 (LMA).

5. The control circuit 31 (CTLA) sets the own SYNC bit 41-2 at the predetermined delayed time after the "Read REQ" signal from the other processor 12 (PB). At this time the reading-out by the other processor 12 (PB) is already finished.

6. The processor 11 (PA) operates other jobs, which are not related to the explanation of the invention, and then; returns to the step (2), and sets the own LOCK bit 41-1; and writes into the own memory 21 (LMA) unless the SYNC bit 41-2 is still in a RESET state inhibitting the writing.

7. The processor 12 (PB) in the B group returns to the step 4 after finishing other jobs.

Consequently, the above-described operation is summarized as follows:

(A) When the processor PA is writing into the own memory LMA, the other processor PB is inhibitted to read from this memory LMA.

(B) After the processor PA finishes writing into the own memory LMA, this processor PA is inhibitted to write next data into memory LMA until the other processor PB finishes reading out of memory. (C) The processor PB is inhibitted to read out the other memory LMA, after finishing reading out the memory LMA until a next writing from the processor PA into the memory LMA is finished.

Though in the above-described embodiment of the invention the local memory LMA is written in exclusively by the own processor PA as well as read out exclusively by the processor PB of the other group B, it is apparently possible for the reverse case where the local memory LMB is read out by the own processor PA as well as written by the processor PB of it's own group B.

Though in the above-described embodiment of the invention a single set of flag bits having one bit for LOCK and one bit for SYNC is provided in each group A or B. Each group may be provided with a plurality of the sets of flag bits, wherein each set communicates with a corresponding one of a plurality of the processors.

Though in the above-described embodiment of the invention a set of the LOCK bit and the SYNC bit is provided in association of with data of a single word, it is also apparently possible to provide a set of LOCK and SYNC bits associated with a set of data comprising a plurality of words, or to include in the local memory a plurality of these sets.

The configuration of the control circuit 31 of FIG. 6 is referred to as a typical sample, any other circuit configuration which achieves the above-described function can be used in place of the circuit shown in FIG. 6.

Advantages of the present invention are:

Firstly the fact that the setting/resetting of the flags can be carried out by the internal communication within each group as well as by a memory access from group, contributes to achieve a simple network configuration without requiring the control lines 4 used only for synchronization.

Secondly the software can be perfectly free from the job synchronization, because the processor can be halted by inhibitting the access request signal, resulting in a reduced network traffic, and a high-speed operation.

Thirdly the simplified hardware helps achieve a high-speed synchronization operation.

The many features and advantages of the invention are apparent from the detailed specification and thus, it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What we claim is:

1. A multiprocessor system comprising at least a first processor, a second processor, a memory coupled to and accessed by the first processor over a first data bus, coupled to and accessed by the second processor over a second data bus:

memory LOCK means, connected to the first processor, for inhibiting access to the memory by the second processor, while the first processor is accessing the memory;

memory SYNC means, connected to the first processor, for synchronizing and alternately allowing a transfer of an access request signal from the second processor to the memory, while request signal from the second processor to the memory, while inhibiting access to the memory by the first processor; and control circuit means, coupled to the memory, the first processor, said memory LOCK means, said memory SYNC means and receiving an access request signal from the first processor and the access request signal from the second processor, said coupling being independent of the first and second data to the memory in accordance with said memory LOCK means and said memory SYNC Means, said control circuit means allowing the first processor to access the memory said control circuit means allowing the second processor to access the memory only after the first processor is finished accessing the memory, circuit means inhibiting the first processor from said control further accessing the memory regardless of whether the second processor is requesting access to the memory, said control circuit means controlling access to the memory by the first and second processors responsive to only the access request signals from the first and second processors, thereby allowing alternating access to the memory by the first and second processors.

2. A multiprocessor system according to claim 1, wherein:
    said memory LOCK means comprises means for inhibiting reading of the memory by the second processor while the first processor is writing into the memory;
    said memory SYNC Means comprises means for allowing a transfer of a read request signal to the memory from the second processor and inhibiting a write request signal to the memory from the first processor;
    said control circuit means comprises means for controlling one of writing into and reading out of the memory by the second processor, responsive to said memory LOCK means and said memory SYNC means, said control circuit means controlling access to the memory by the second processor responsive to only the read request signal from the second processor.

3. A multiprocessor system according to claim 2, wherein the memory is coupled to be written into by the first processor only and read from by the second processor only.

4. A multiprocessor system according to claim 2, wherein the memory is coupled to a plurality of the first processors, said multiprocessor system further comprises: network means, coupled to the memory, the plurality of first processors and the second processor, for transferring data between the memory, the plurality of first processors and the second processor; and the second processor comprises means for reading out data from the memory via said network means and the read request signal.

5. The multiprocessor system according to claim 4, further comprising:
    a plurality of said memory LOCK means provided for and coupled to corresponding ones of the first processors and the second processor;
    a plurality of said memory SYNC means provided for and coupled to corresponding ones of the first processors and the second processor; and
    said control circuit means provided for and coupled to the memory, each of said memory LOCK means, each of said memory SYNC means, each of the first processors and the second processor.

6. A multiprocessor system according to claim 1, wherein:
    said memory LOCK means comprises means for inhibiting writing into the memory by the second processor while the first processor is reading from the memory;
    said memory SYNC means comprises means for allowing transfer of a write request signal to the memory from the second processor and inhibiting a read request signal to the memory from the first processor; and
    said control circuit means comprises means for controlling one of writing into and reading out of the memory by the first and second processors in accordance with said memory LOCk means and said memory SYNC means, said control circuit means controlling access to the memory by the second processor, responsive to only the write request signal.

7. A multiprocessor system including at least a first processor, a second processor, a memory connected to and accessed by the first processor over a first data bus couple to and accessed by the second processor over a second data bus and receiving read request and write request signals from the first and second processors respectively, and an access control system comprising:
    memory LOCK means, connected to the first processor, for inhibiting reading of the memory by the second processor while the first processor is writing into the memory;
    memory SYNC means, connected to the first processor, for synchronizing and alternately allowing a transfer of the read request signal to the memory from the second processor, and for inhibiting the write request signal to the memory from the first processor until the read request signal from the second processor is received and reading is finished; and
    control circuit means, coupled to the first processor, said memory LOCK means, said memory SYNC means and receiving the write request signal from the first processor and the read request signal from the second processor, said coupling being independent of the first and second data buses, for controlling writing into and reading out of the first processor and the memory by the second processor respectively in accordance with said memory LOCK means and said memory SYNC means, said memory LOCK means and said memory SYNC means enabling the first processor to write into the memory, as soon as writing by the first processor is finished, said memory LOCK means and said memory SYNC means enabling the read request signal from the second processor to be accepted by the memory, said control circuit means allowing the second processor to read from the memory only after the first processor has finished writing into the memory, thereby allowing alternating access to the memory by the first and second processors.

* * * * *

UNITED STATES PATENT AND TRADEMARK OFFICE
CERTIFICATE OF CORRECTION

PATENT NO. : 4,975,833

DATED : December 4, 1990

INVENTOR(S) : Akira JINZAKI

It is certified that error appears in the above-identified patent and that said Letters Patent is hereby corrected as shown below:

ON TITLE PAGE:  under "Abstract", line 3, delete "and";

line 8, change "accesse" to --access--.

Col. 1,  line 18, after "where" insert --a--;

line 19, delete "a";

line 22, delete "the";

line 23, delete "the";

line 24, after "memory" insert --102--;

line 25, change "a" to --the--;

line 26, change "the" to --a--.

Col. 2,  line 37, change "of" to --on--;

line 38, delete "the";

line 46, delete "the" (second occurrance);

line 47, change "inhibitted" to --inhibited--.

Figure 3:
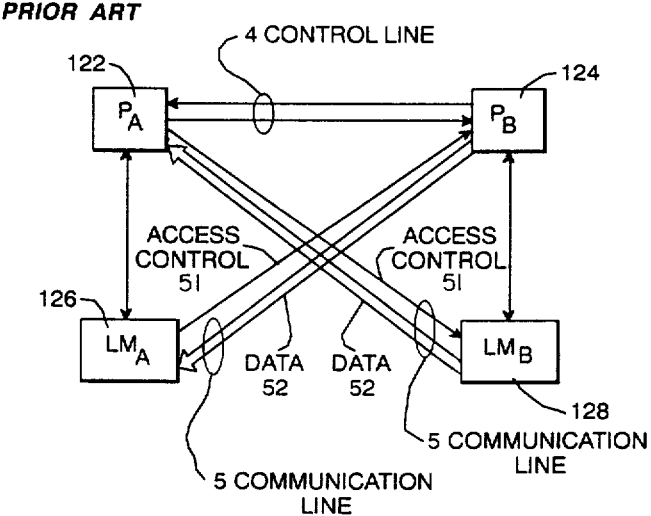
FIG. 3 shows schematic configuration of a prior art multiprocessor system where the synchronization is controlled by hardware with an additional software for synchronization control.
Figure 4:
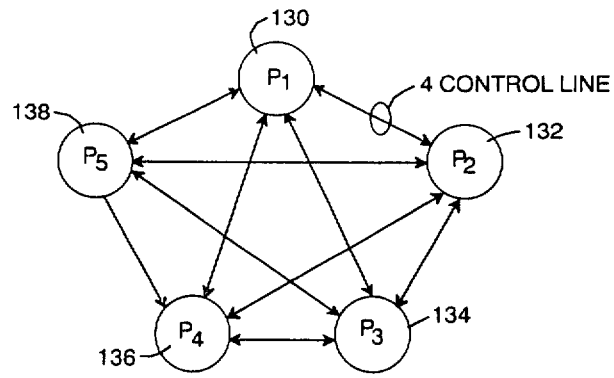
FIG. 4 shows required networks in the configuration of multiprocessor system according to the present invention.

Col. 3,  line 9, after "shows" insert --a--;

line 12, after "shows" insert --a--;

line 14, delete "an";

line 16, delete all after "of";

line 17, change "vention" to --Fig. 3--;

UNITED STATES PATENT AND TRADEMARK OFFICE
CERTIFICATE OF CORRECTION

Figure 5:
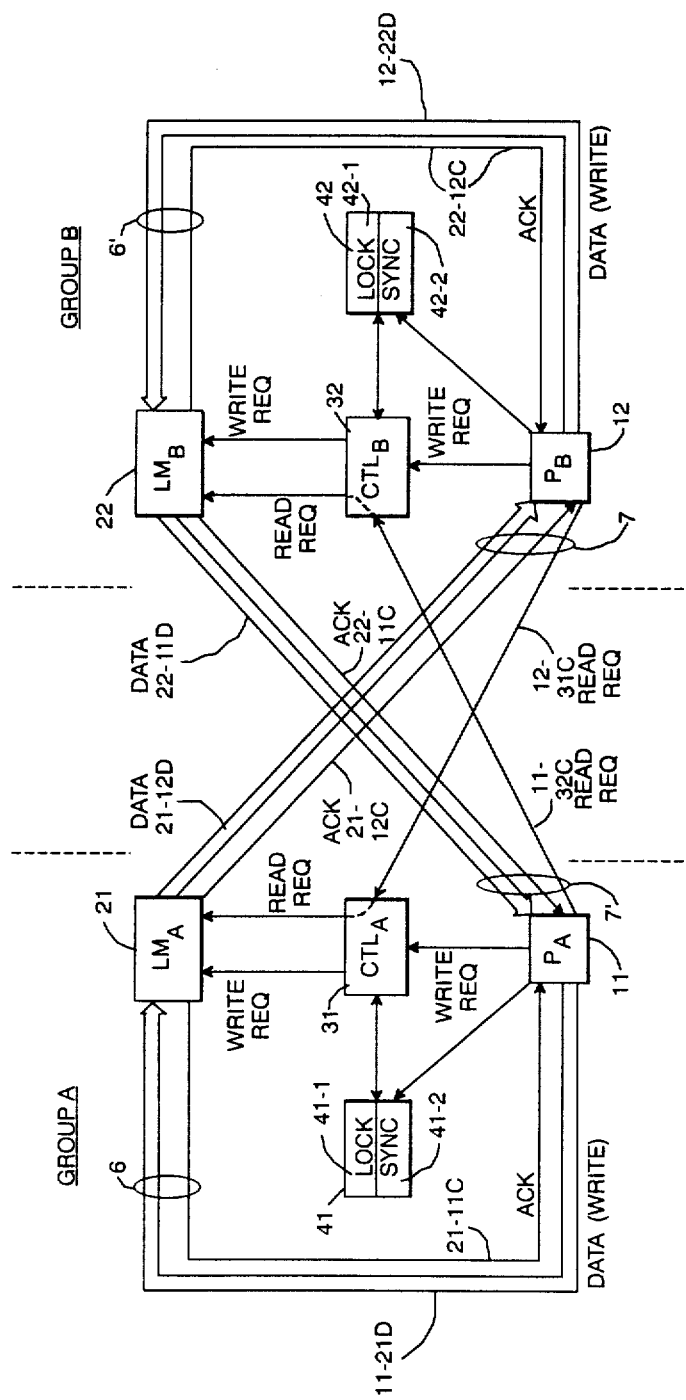

PATENT NO. : 4,975,833  Page 2 of 4
DATED : December 4, 1990
INVENTOR(S) : Akira JINZAKI It is certified that error appears in the above-identified patent and that said Letters Patent is hereby corrected as shown below:

Col. 3, between lines 17 and 18, insert a new paragraph: --Fig. 5 shows a schematic configuration of a multiprocessor system according to the present invention--;

line 56, change "comprises" to --comprise--.

Col. 4, line 19, change "inhibitted" to --inhibited--;

line 30, change "inhibitted" to --inhibited--;

line 57, change "formed of" to --comprises a--.

Col. 5, line 27, after "memory" insert --21 (<MA)--;

line 45, change "inhibitted" to --inhibited--;

line 49, change "inhibitted" to --inhibited--;

UNITED STATES PATENT AND TRADEMARK OFFICE
CERTIFICATE OF CORRECTION

PATENT NO. : 4,975,833

DATED : December 4, 1990

INVENTOR(S) : Akira JINZAKI

It is certified that error appears in the above-identified patent and that said Letters Patent is hereby corrected as shown below:

Col. 5,   line 51, begin a new paragraph with "(C)";

line 52, change "inhibitted" to --inhibited--;

line 62, after "written" insert --into--.

Col. 6,   line 18, before "group" insert --another--, and delete "contributes";

line 22, after "job" insert --of--;

line 23, change "inbitting" to --inhibiting--;

UNITED STATES PATENT AND TRADEMARK OFFICE
CERTIFICATE OF CORRECTION

PATENT NO. : 4,975,833

DATED : December 4, 1990

INVENTOR(S) : Akira JINZAKI

It is certified that error appears in the above-identified patent and that said Letters Patent is hereby corrected as shown below:

Col. 6, line 44, after "bus" insert --an access control system comprising:--;

line 52, delete "request signal from";

line 53, delete all before "inhibit";

line 62, after "data" insert --buses, for controlling access of the first and second processors--;

line 63, change "Means" to --means--;

line 68, before "circuit" insert --said control--.

Col. 7, line 1, delete "said control".

Signed and Sealed this

Seventh Day of July, 1992

Attest:

DOUGLAS B. COMER

Attesting Officer

Acting Commissioner of Patents and Trademarks